(12) United States Patent
Hamidi et al.

(10) Patent No.: US 11,422,243 B2
(45) Date of Patent: *Aug. 23, 2022

(54) TECHNIQUES FOR USING WAVEGUIDE ANGLES IN A LIDAR SYSTEM

(71) Applicant: AEVA, INC., Mountain View, CA (US)

(72) Inventors: Ehsan Hamidi, San Francisco, CA (US); Behsan Behzadi, Sunnyvale, CA (US); Pradeep Srinivasan, Fremont, CA (US); Mina Rezk, Haymarket, VA (US)

(73) Assignee: AEVA, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,032

(22) Filed: May 13, 2021

(65) Prior Publication Data

US 2022/0137198 A1 May 5, 2022

Related U.S. Application Data

(63) Continuation of application No. 17/086,266, filed on Oct. 30, 2020, now Pat. No. 11,105,904.

(51) Int. Cl.
*G01S 7/4915* (2020.01)
*G01S 7/481* (2006.01)
*G01S 7/4913* (2020.01)

(52) U.S. Cl.
CPC .......... *G01S 7/4915* (2013.01); *G01S 7/4818* (2013.01); *G01S 7/4913* (2013.01)

(58) Field of Classification Search
CPC .... G01S 7/4915; G01S 7/4913; G01S 7/4818; G02B 26/0841; G02B 6/12007; G02B 6/124; G02B 6/3518; G02B 6/3596; G02B 6/4208; G02B 6/2713; G02B 6/2746; G02B 6/278; G02B 26/0883
See application file for complete search history.

(56) References Cited

U.S. PATENT DOCUMENTS 10,401,480 B1 9/2019 Gaalema et al.
10,802,120 B1 10/2020 Lachapelle et al.
(Continued)

*Primary Examiner* — Yuqing Xiao
*Assistant Examiner* — Amir J Askarian
(74) *Attorney, Agent, or Firm* — Womble Bond Dickinson (US) LLP

(57) ABSTRACT

A LIDAR system includes an optical source and multiple waveguides at different positions within the LIDAR system to receive a return signal. A first waveguide receives a first portion of the return signal at a first angle relative to the scanning mirror and a second waveguide receives a second portion of the return signal at a second angle relative to the scanning mirror. The system further includes multiple optical detectors at different positions within the LIDAR system. A first optical detector receives the first portion of the return signal from the first waveguide and a second optical detector receives the second portion of the return signal from the second waveguide. The system further includes a signal processing system operatively coupled to the plurality of optical detectors to determine a distance and velocity of the target object based on the returned signal and corresponding positions of the plurality of waveguides.

18 Claims, 12 Drawing Sheets

(56) References Cited

U.S. PATENT DOCUMENTS

| | | |
|---|---|---|
| 2020/0081106 A1* | 3/2020 | Kocaoglu ............... G01S 17/08 |
| 2020/0110179 A1 | 4/2020 | Talty et al. |
| 2020/0124711 A1 | 4/2020 | Rezk et al. |
| 2020/0284883 A1 | 9/2020 | Ferreira et al. |
| 2020/0300980 A1 | 9/2020 | Behzadi et al. |
| 2020/0319314 A1 | 10/2020 | Behzadi et al. |
| 2020/0333533 A1* | 10/2020 | Rogers ................. G02B 6/2746 |
| 2020/0400822 A1 | 12/2020 | Ando et al. |

* cited by examiner

TECHNIQUES FOR USING WAVEGUIDE ANGLES IN A LIDAR SYSTEM

CROSS-REFERENCE TO RELATED APPLICATIONS

This application is a continuation of U.S. patent application Ser. No. 17/086,266, filed Oct. 30, 2020. The contents of the above-referenced application is hereby incorporated by reference in its entirety.

FIELD

The present disclosure is related to light detection and ranging (LIDAR) systems in general, and more particularly to mitigating lag-angle effects for LIDAR scans.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal (LO signal). Mixing the LO signal with the return signal, delayed by the round-trip time to the target and back, generates a beat frequency at the receiver that is proportional to the distance to each target in the field of view of the system.

These LIDAR systems employ optical scanners with high-speed mirrors to scan a field of view (FOV) and to de-scan target return signals from the FOV. As mirror speeds are increased, mirror movement during the round trip time to and from a target, especially for distant targets, can cause light returned from the target to be slightly off angle with respect to a scanning mirror at the time of the arrival of the returned light at a receiver. The lag angle can result in degradation of the signal-to-noise ratio at sensors of the receiver.

SUMMARY

The present disclosure describes various examples of LIDAR systems and methods for mitigating lag angle effects of a LIDAR scan.

In one example, a LIDAR system according to the present disclosure includes an optical source to generate an optical beam towards a target object. A distance of the target object may cause a return signal to be transmitted at different angles from a scanning mirror towards a receiver of the LIDAR system. A plurality of waveguides may be disposed at different positions within the LIDAR system to receive the return signal at the different angles. A first waveguide from the plurality of waveguides receives a first portion of the return signal at a first angle relative to the scanning mirror and a second waveguide from the plurality of waveguides receives a second portion of the return signal at a second angle relative to the scanning mirror. The LIDAR system further includes a plurality of optical detectors disposed at different positions within the LIDAR system. A first optical detector from the plurality of optical detectors receives the first portion of the return signal from the first waveguide and a second optical detector from the plurality of optical detectors receives the second portion of the return signal from the second waveguide. The LIDAR system also includes a signal processing system operatively coupled to the plurality of optical detectors to determine a distance and velocity of the target object based on the returned signal and corresponding positions of the plurality of waveguides.

In some embodiments the LIDAR system further includes an optical transmission line comprising a transmission waveguide to transmit the optical beam to scanner optics, the scanner optics to direct the optical beam toward a target object. In some embodiments, the return signal is focused on a receiver by the scanner optics. In some embodiments, each of the plurality of waveguides are disposed on a substrate and wherein each of the plurality of waveguides is offset from an adjacent waveguide. In some embodiments, each the plurality of waveguides is offset from the adjacent waveguides by a distance to provide uniform coupling of the return signal into the plurality of waveguides. In some embodiments, the first waveguide is disposed on a first epitaxial layer of a photonics chip and the second waveguide is disposed on a second epitaxial layer of the photonics chip.

In some embodiments, the first epitaxial layer is silicon nitride and the second epitaxial layer is silicon-on-oxide. In some embodiments, a local oscillator signal is combined with the return signal at the plurality of optical detectors to produce a beat frequency to calculate the distance. In some embodiments, the signal processing system includes one or more filtering components operatively coupled to the plurality of optical detectors. In some embodiments, LIDAR system further includes a filtering component, wherein each of the plurality of optical detectors are operatively coupled to the filtering component and the plurality of optical detectors are coupled in parallel, wherein the return signal received at the plurality of optical detectors are summed prior to being provided to the filtering component. In some embodiments, a local oscillator signal is distributed across the plurality of optical detectors, wherein a power level of the local oscillator signal provided to each of the plurality of optical detectors is associated with a position of the corresponding waveguide.

In one example, a method in a light detection and ranging (LIDAR) system, includes transmitting an optical beam toward a target object; receiving a returned signal at a receiver of the LIDAR system, the receiver comprising a plurality of receiving waveguides, the returned signal being reflected from the target object; and providing, via the plurality of receiving waveguides, the returned signal to one or more optical detectors coupled to the plurality of receiving waveguides.

In some embodiments, the method further includes generating a local oscillator signal for the one or more optical detectors by splitting the optical beam into one or more local oscillator signals prior to transmitting the optical beam toward the target object. In one embodiment, the method of claim 12, further includes generating, by an optical source, the optical beam and directing the optical beam, via a transmitting waveguide, to an external polarization beam splitter and scanner optics, the scanner optics to direct the optical beam toward the target object.

In one embodiment, the method includes receiving the returned signal at the scanner optics, the scanner optics to direct the returned signal toward the polarization beam splitter and focusing the returned signal from the polarization beam splitter onto the receiver of the LIDAR system via a reflecting surface. In one embodiment, each the plurality of receiving waveguides is offset from adjacent receiving waveguides by a distance to provide uniform coupling of the returned signal into the plurality of receiving waveguides. In one embodiment, the method further includes combining the returned signal with a local oscillator signal at each of the one or more optical detectors to generate a beat frequency and processing the beat frequency using a signal processing system. In one embodiment, processing the beat frequency using the signal processing system includes amplifying the returned signal from each of the one or more optical detectors and applying a band-pass filter to the signal from each, the band-pass filter comprising a band range associated with a position of the corresponding receiving waveguide.

In one embodiment, processing the beat frequency using the signal processing system includes summing the returned signal from each of the one or more optical detectors to generated a resulting signal and filtering the resulting signal using a band-pass amplifying component. In one embodiment, the plurality of receiving waveguides are disposed on a first epitaxial layer of a photonics chip and the transmission waveguide is disposed on a second epitaxial layer of the photonics chip.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

The present disclosure describes various examples of LIDAR systems and methods for mitigating lag angle effects for LIDAR scans. According to some embodiments, the described LIDAR system may be implemented in any sensing market, such as, but not limited to, transportation, manufacturing, metrology, medical, and security systems. According to some embodiments, the described LIDAR system can be implemented as part of a front-end of frequency modulated continuous-wave (FMCW) device that assists with spatial awareness for automated driver assist systems, or self-driving vehicles.

Lidar systems described by the embodiments herein include coherent scan technology that includes the use of transmission lines, one or more sensors, receivers, and at least one local oscillator (i.e., a local copy of the transmission line). A scanning element (e.g., galvo mirror) is used to transmit the beam of light towards targets in the field of view of a sensor used by Lidar systems described herein. A beam reflected from the target is collected by a lens system and combined with the local oscillator. As mirror speeds are increased, mirror movement during the round trip time to and from a target, especially for distant targets, can cause light returned from the target to be slightly off angle with respect to a scanning mirror at the time of the arrival of the returned light at a receiver. The lag angle can result in degradation of the signal-to-noise ratio at sensors of the receiver. Using the techniques described herein, embodiments of the present invention can, among other things, address the issues described above by providing an expanded field of view of the receiver on a LIDAR system. Multiple waveguides can be provided on a substrate or photonics chip to receive returned beams having different lag angles to increase the field of view of a receiver.

Figure 1:
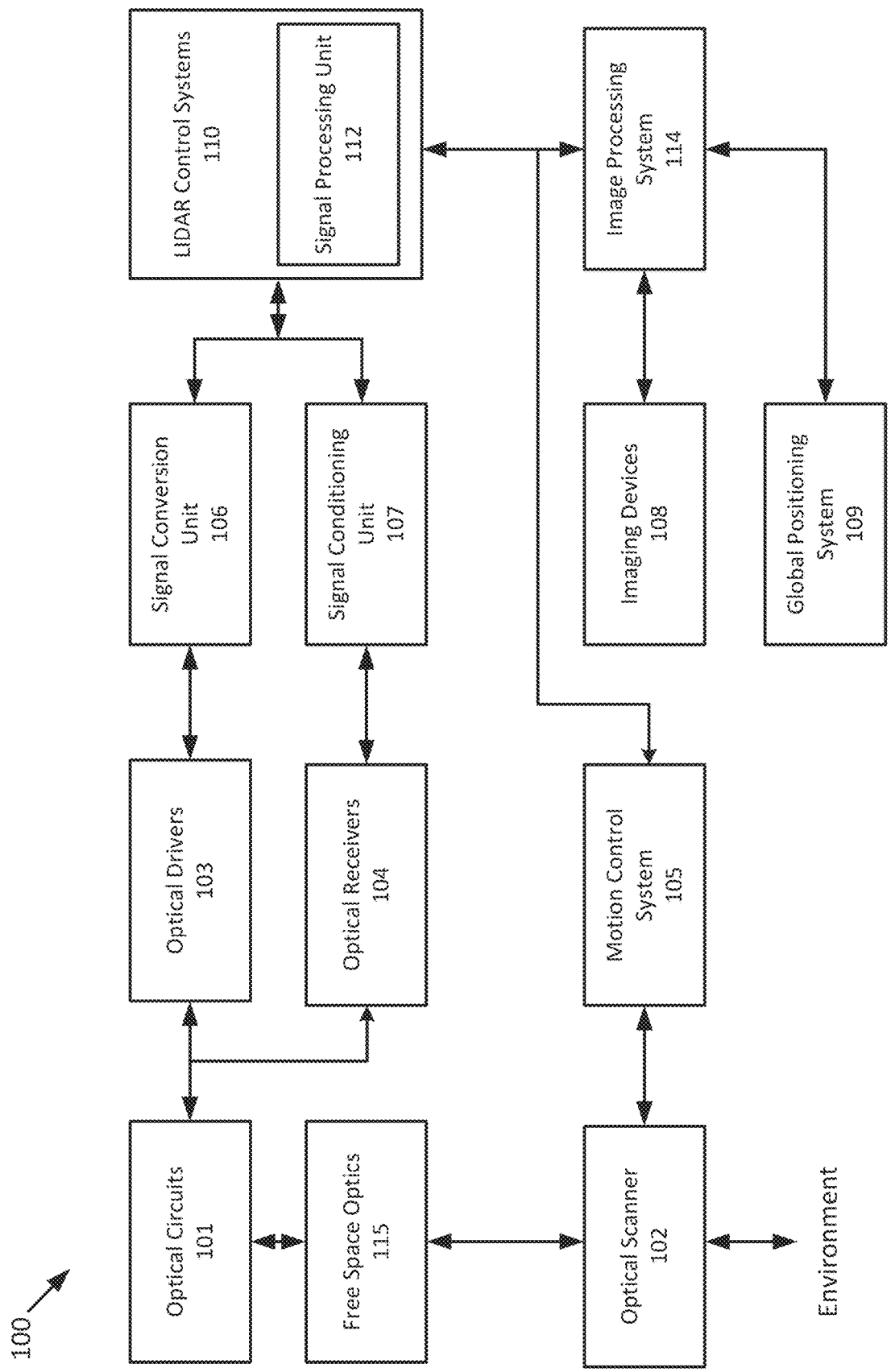
FIG. 1 illustrates an example FMCW LIDAR system according to embodiments of the present disclosure.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers, non-reciprocal elements such as Faraday rotator or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device such as signal processing unit 112. In some examples, signal processing unit 112 may be one or more general-purpose processing devices such as a microprocessor, central processing unit, or the like. More particularly, signal processing unit 112 may be complex instruction set computing (CISC) microprocessor, reduced instruction set computer (RISC) microprocessor, very long instruction word (VLIW) microprocessor, or processor implementing other instruction sets, or processors implementing a combination of instruction sets. Signal processing unit 112 may also be one or more special-purpose processing devices such as an application specific integrated circuit (ASIC), a field programmable gate array (FPGA), a digital signal processor (DSP), network processor, or the like.

In some examples, signal processing unit 112 is a digital signal processor (DSP). The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
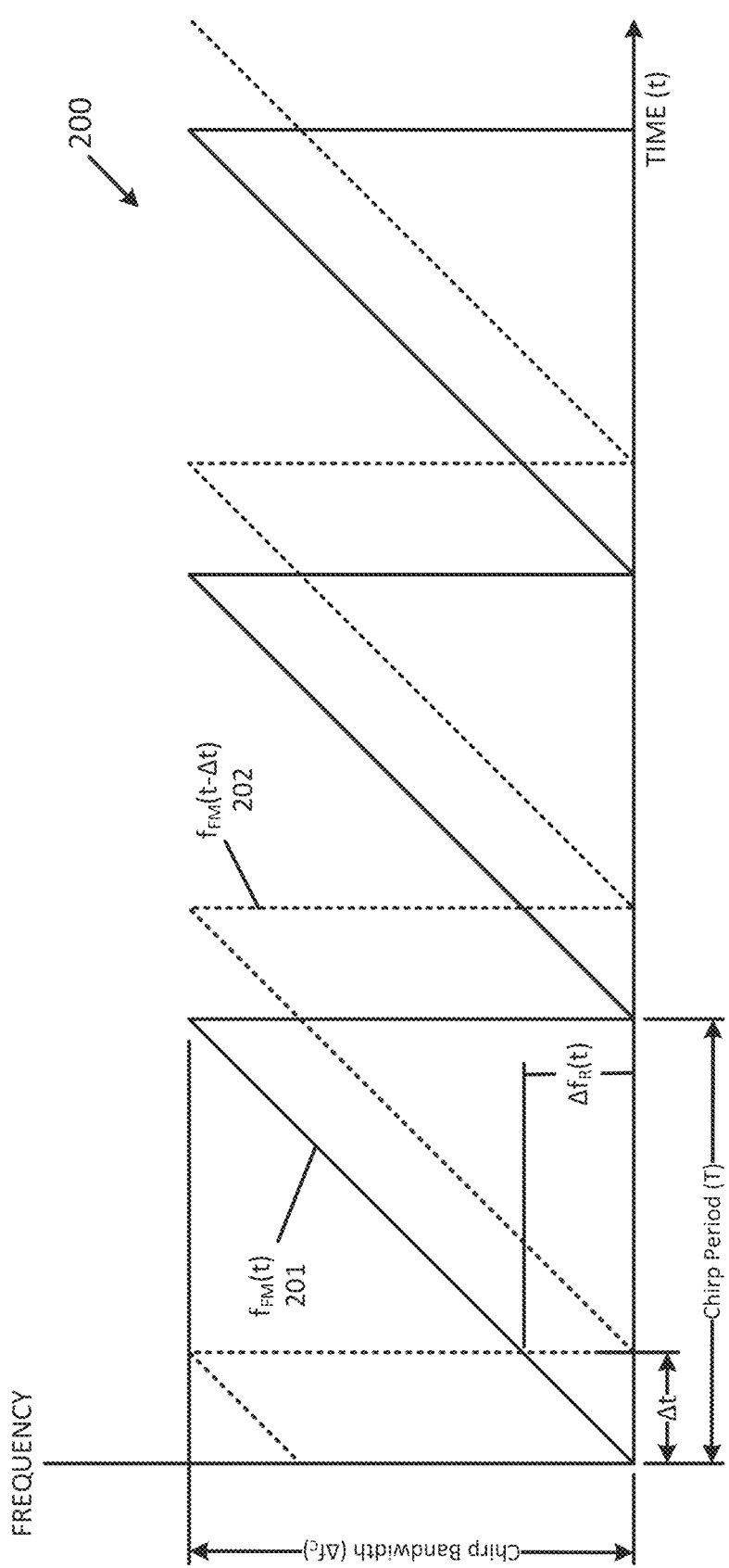
FIG. 2 is a time-frequency diagram illustrating an example of FMCW LIDAR waveforms according to embodiments of the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$. FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner. It should be noted that while embodiments of the present disclosure may be used in conjunction with FMCW LiDAR, the disclosure is not limited to FMCW LiDAR and embodiment may be used with any other form of coherent LiDAR as well.

Figure 3:
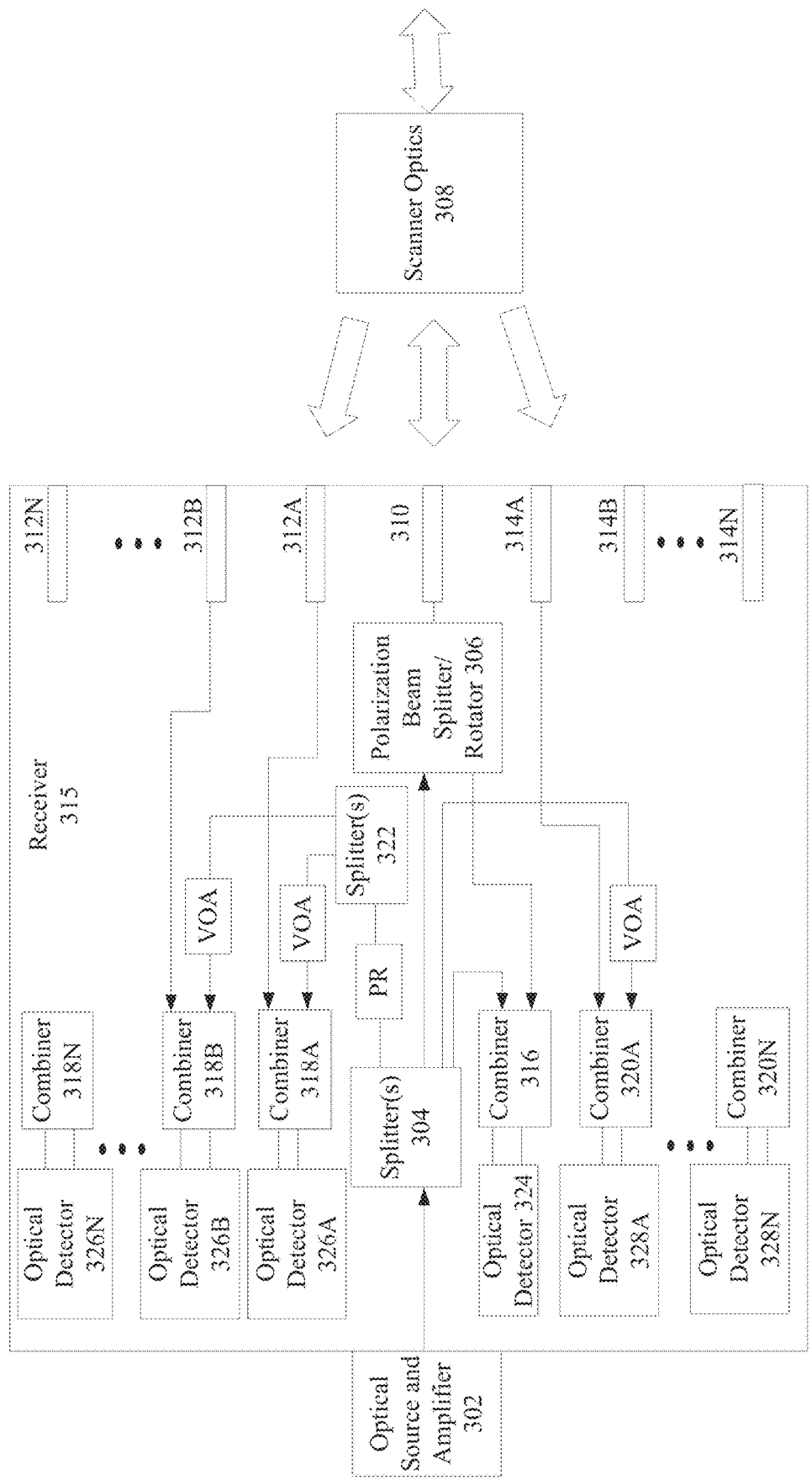
FIG. 3 is a block diagram of an example optical receiver and processing system according to embodiments of the present disclosure.

FIG. 3 illustrates an example of an optical receiver system 300, according to one embodiment. Optical system 300 includes an optical source and amplifier 302 to generate an optical beam and a receiver 315 to transmit the optical beam and receive a returned optical beam. The optical source and amplifier 302 may transmit the optical beam to a splitter 304. The splitter 304 may reflect one or more portions of the optical beam to generate several instances of a local oscillator (LO). The LOs may then be transmitted to a polarizer/rotator (PR) for to produce a polarized LO (similar to the polarized beam discussed below). Splitter(s) 322 may receive polarized LO and split the polarized LO into several different LOs to be transmitted to respective combiners 316, 318A-N, and 320A-N. Each LO may then be transmitted to an optical attenuation, such as a variable optical attenuator (VOA) to adjust the power level of each of the LOs provided to combiners 316, 318A-N, and 320A-N. As described below, each of the LOs are combined with a returned signal at the combiners to generated a beat signal that can then be detected by the optical detectors 324, 326A-N, and 328A-N. The power of each LO may be adjusted to maximize the SNR at the optical detectors 324, 326A-N, and 328A-N, as described with respect to FIGS. 9B, 10C, and 10D below. The splitter 304 may reflect a portion of the optical beam to create the LOs while allowing the majority of the optical beam to be transmitted to a polarization beam splitter/rotator (PBR) 306. The PBR 306 may transform the polarization state and/or rotate the optical beam to produce a polarized optical beam. The polarized optical beam may then be transmitted by a transmitting waveguide to scanner optics 308 of the optical system to be directed towards targets at different locations within the field of view (FOV) of the system 300. The optical beam may then be reflected by a target and returned to the scanner optics 308 to produce a return optical signal. The scanner optics 308 may then focus the returned optical signal on one or more receiving waveguides 310, 312A-N, and 314A-N of the receiver 315 (e.g., a photonics chip). The receiver 315 may include several receiving waveguides 310, 312A-N and 314A-N to receive the returned optical beam and guide the received optical beam to one or more processing components of the system 300.

In some embodiments, scanner optics 308 includes a scanning mirror (not depicted), and may include lenses, PWPs, non-reciprocal elements and so like elements. As the scanning speed of the scanning mirror increases (e.g., for high frame rate applications) and target distance, and thus time of travel increase, the mirror may rotate a non-negligible amount before the beam is returned causing the returned beam to be reflected by the scanning mirror at different angles (referred to herein as a "lag angle"). In one embodiment, depending on the lag angle associated with the returned optical beam, the scanner optics may focus the returned optical beam on one or more of the receiving waveguides 310, 312A-N and 314A-N. In one embodiment, the receiving waveguides 310, 312A-N and 314A-N guide the returned optical signal to combiners 316, 318A-N, and 320A-N where the returned optical signal is combined with a particular portion of the LO received from splitter 306 and/or from additional splitters (e.g., splitter(s) 322). The combined signal resulting from combining the LO and the returned signal is then provided to optical detectors 324, 326A-N and 328A-N (e.g., photodetectors).

As depicted, each of the receiving waveguides 310, 312A-N, and 314A-N may guide the returned signal to a single corresponding optical detector 324, 326A-N and 328A-N. For example, for short range targets the lag angle is minimal and the returned beam will be received at the centered waveguide 310. The receiving waveguide 310 may provide the returned signal to optical detector 324, receiving waveguide 312A may provide the returned signal to optical detector 326A, and so forth with each of the corresponding pairs of waveguides and optical detectors. As target distance increases, lag angle increases thereby causing the returned signal to be received at waveguides that are offset from center (e.g., 312A-N or 314A-N). The larger the lag angle, the further the returned beam will be focused away from the center waveguide (e.g., waveguide 310). Therefore, the plurality of waveguides 310, 312A-N, and 314A-N may provide a larger detection FOV for the receiver 315.

Figure 4:
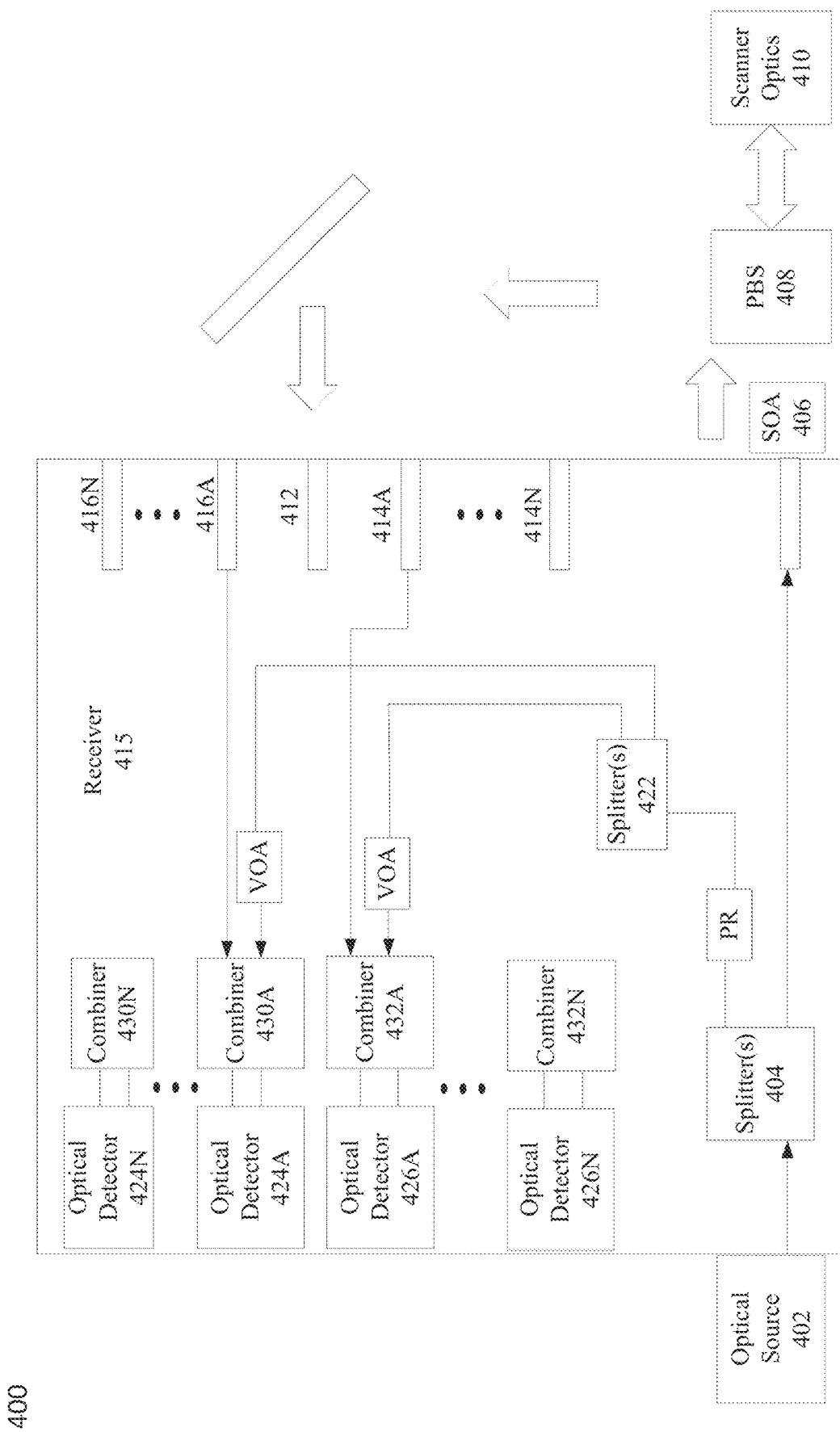
FIG. 4 is a block diagram of an example optical receiver and processing system according to embodiments of the present disclosure.

FIG. 4 illustrates another example of an optical system 400 for mitigating lag angle effects of a LIDAR scan, according to one embodiment. Similar to the system 300 of FIG. 3, system 400 may include an optical source 402 to produce an optical beam and a beam splitter 404 to split the optical beam into an LO and a transmitted beam. However, unlike optical system 300, the transmitting waveguide is separated from the receiving waveguides. System 400 includes an external amplifier 406 to amplify and maximize the power of the transmitted beam and bypass losses associated with the receiver 415 (e.g., photonics chip). The optical system 400 may further include an off-chip polarization beam splitter 408. The transmitted beam may pass through the off-chip polarization beam splitter 408 and scanner optics 410. Scanner optics 410 may direct the transmitted beam toward targets within the FOV of the optical system 400. The transmitted beam is then reflected by a target and returned to the scanner optics 410, reflected from the polarization beam splitter 408 and directed toward the optical receiver 415. The receiver 415 may include several receiving waveguides 412, 414A-N, and 416A-N to receive the returned optical beam and guide the received optical beam to one or more processing components of the system 400.

In one embodiment, depending on the lag angle associated with the returned optical beam, the scanner optics may focus the returned optical beam on one or more of the receiving waveguides 412, 414A-N, and 416A-N. In one embodiment, the receiving waveguides 412, 414A-N, and 416A-N guide the returned optical signal to combiners where the returned optical signal is combined with a particular portion of the LO. The LO may be split into several portions by splitter(s) 422. The splitter(s) 422 may then provide respective portions of the LO to the combiners 430A-N and 432A-N to be combined with the returned signal. The combined signal resulting from combining the LO and the returned signal is then provided to optical detectors 424A-N and 426A-N (e.g., photodetectors). As depicted, each of the receiving waveguides 412, 414A-N and 416A-N may guide the returned signal to a single corresponding optical detector of the optical detectors 424A-N and 426A-N. Separating the transmitting waveguide from the receiving waveguides may increase flexibility for design of the numerical aperture for the receiving waveguides. Although depicted as external to the receiver 415, PBS 408 may alternatively be included within receiver 415 (e.g., the PBS 408 may be on or off chip).

Figure 5:
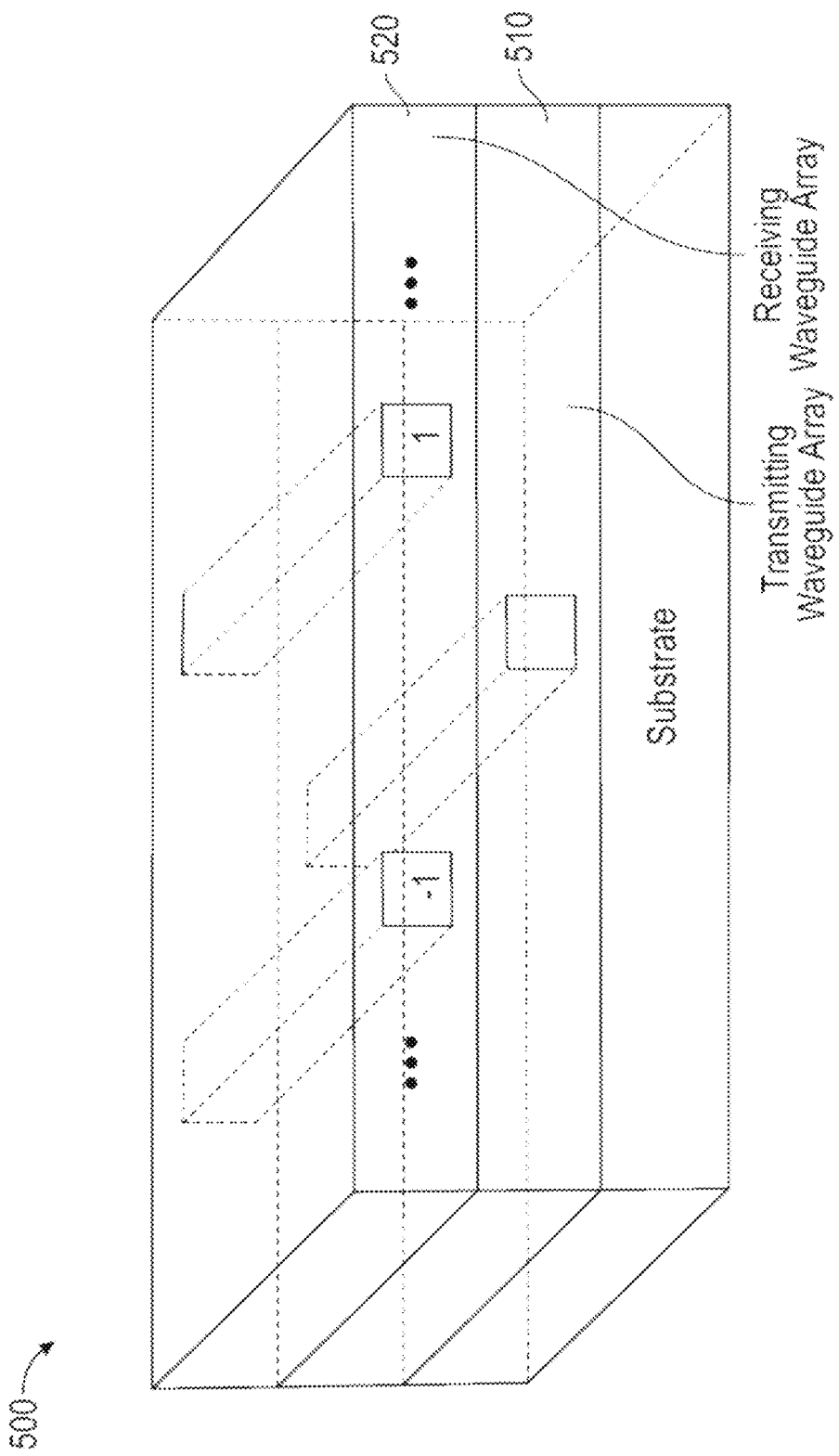
FIG. 5 is a block diagram of an example multi-layered photonics chip according to embodiments of the present disclosure.

FIG. 5 illustrates an example of a multi-layered photonics chip 500 depicting the transmission and receipt of signals using waveguides, according to one embodiment. The photonics chip 500 may include several layers. Each layer may include one or more waveguides or other optical processing components or free-space optics. As depicted, a transmitting waveguide may be included a first epitaxial layer 510 of the photonics chip 500. Multiple receiving waveguides and may be included in a second epitaxial layer 520 of the photonics chip 500. The first epitaxial layer 510 may be a silicon on-oxide layer or any other insulator. The second epitaxial layer 520 may be a different insulator material, such as silicon nitride layer. The first epitaxial layer 510 and the second epitaxial layer 520 may be made of different materials to minimize the perturbation of a transmitted beam due to leakage of the light from the transmitting waveguide into the surrounding array of receiving waveguides. Thus, the transmitted beam may be emitted from the transmitting waveguide to scanner optics to be directed to a target object. The scanner optics may then direct a returned optical beam reflected from the target object onto the receiving waveguide array.

Figure 6:
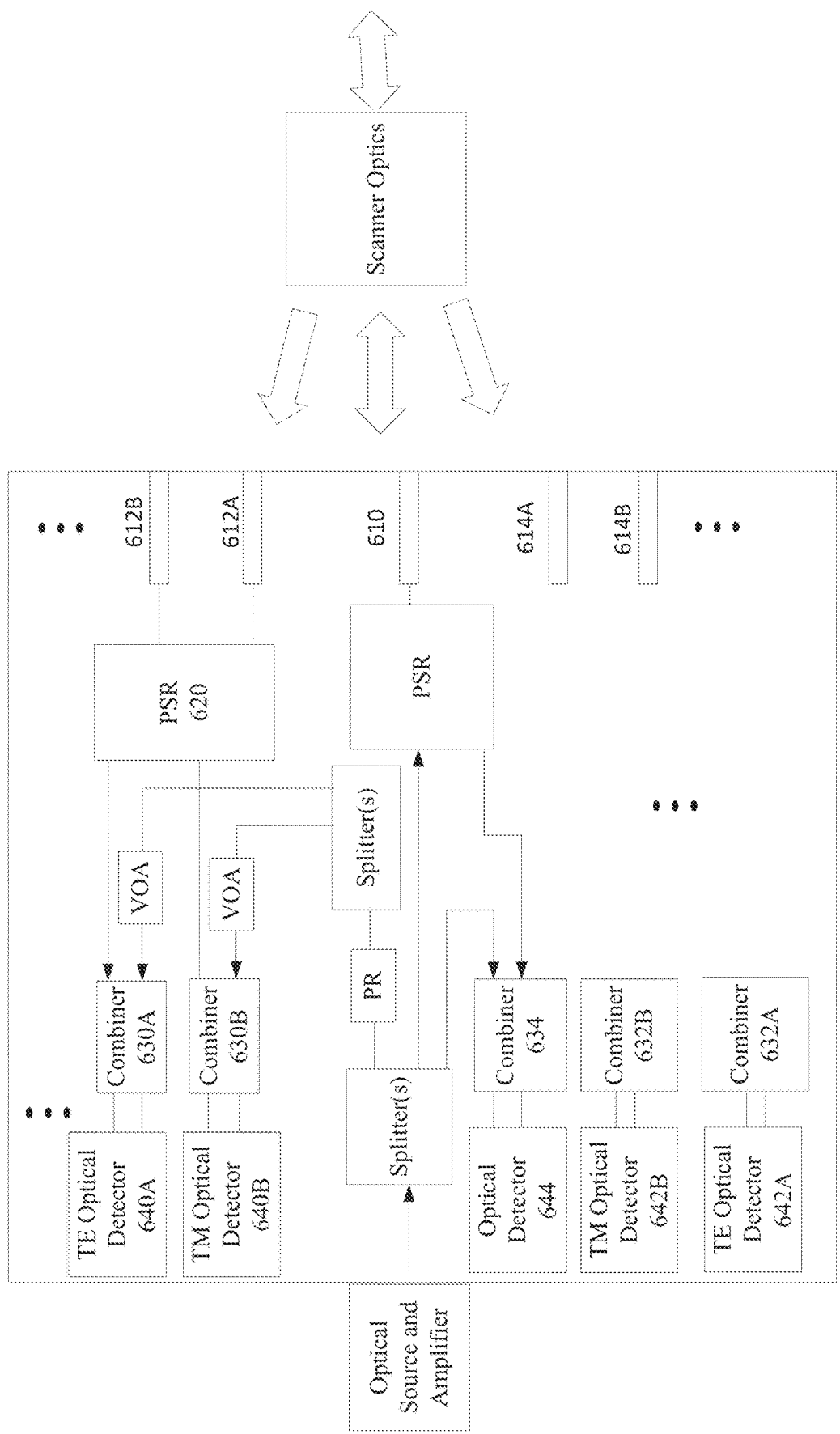
FIG. 6 is a block diagram of an example optical receiver and processing system according to embodiments of the present disclosure.

FIG. 6 illustrates another example of an optical system 600. Optical system 600 includes a polarization diverse architecture for mitigation of lag-angle effects. In particular, optical system 600 includes polarization beam splitter 620 to split the returned signal received from one of the receiving waveguides 612A-612B into separate polarized beams. The polarization beam splitter 620 may direct each polarized beam to an associated combiner 630A-B to be combined with an LO and provided to separate optical detectors 640A-B. An additional one or more polarization beam splitters may receive a returned signal from receiving waveguides 610 and 614A-B and generate separate polarized beams for combiners 632A-B and 634 and optical detectors 642A-B and 644. An LO signal may be generated for each combiner and optical detector using one or more splitters, PRs and VOAs as described above with respect to FIG. 3.

In one example, this embodiment allows for collection of both diffusive and specular targets. Furthermore, additional information about the target's material properties or orientation may be collected from the returned beam using the different polarization states of collected light. Due to polarization based differences in reflectivities of targets, the two signals can have different SNR measurements which can be used to determine the additional information. In one example, the polarizations may be transverse magnetic (TM) polarization and transverse electric (TE) polarizations.

Figure 7A:
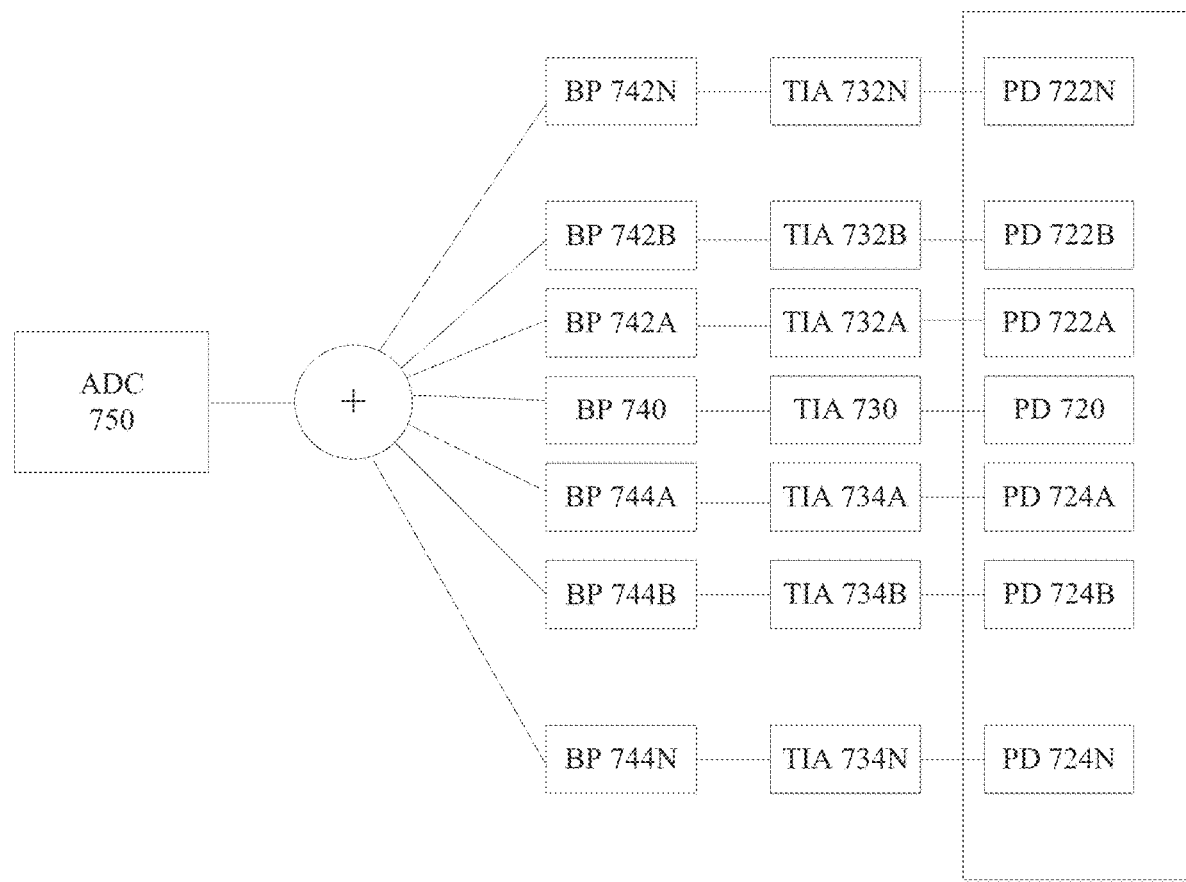
FIG. 7A is a block diagram of an example signal processing system according to embodiments of the present disclosure.

FIG. 7A illustrates a signal processing system 700 for processing of a signal of a beat frequency generated by a returned optical beam and LO received from a receiving waveguide. Each optical detector (PD) 720, 722A-N, and 724 A-N (e.g., photodetector) may be coupled with a receiving waveguide to detect the beat frequency associated with the returned optical beam. To process the beat frequency signal, each of the optical receivers 720, 722A-N, and 724A-N may be coupled with an amplifier (TIA) 730, 732A-N, and 734A-N and a band-pass filter 740, 742A-N, and 744A-N in series to filter out thermal noise, shot noise, and other noise outside a range of the band-pass filter. After the signals from the optical detectors are amplified and filtered, the signals may be combined (e.g., summed) and provided to an analog-to-digital converter (ADC) 750 to convert the analog signal into a digital signal for further processing (e.g., by the LIDAR control systems 110 of FIG. 1).

Figure 7B:
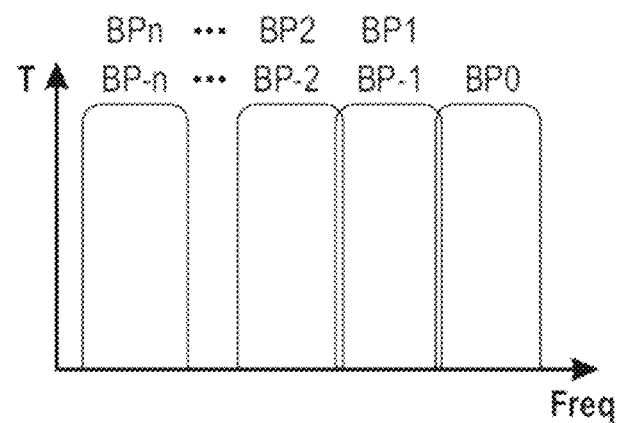
FIG. 7B is a graph diagram of an example distribution of band-pass ranges of a signal processing system according to embodiments of the present disclosure.

Each band-pass filter may allow a different band-range depending on the position of the waveguide associated with the optical detector, as depicted in FIG. 7B. FIG. 7B illustrates the different band-pass ranges for each band-pass filter. Bandwidth of each of the filters may partially overlap to ensure that the full bandwidth of returned signals can be detected by the receiver. In one example, the bandwidth of each filter may be determined by dividing the total bandwidth to be detected divided by one more than the number of optical detectors on either side of the centered optical detector. For example, if there are four optical detectors on either side of the centered optical detector, then the bandwidth for each filter would be the total bandwidth divided by 5. The band range for each band-pass may include frequencies for a particular target ranges. The band range may depend on the position of the corresponding waveguide because a range of distances may be received at each wave guide due to the association of lag angle and target distance. For example, the larger the distance to a target, the larger the lag angle will be, and the further from the centered waveguide the returned beam will be received. Therefore, if the scanner optics characteristics and scanner speed are known, the frequency ranges which correspond to the target distance can be paired with the corresponding waveguide location.

Figure 8A:
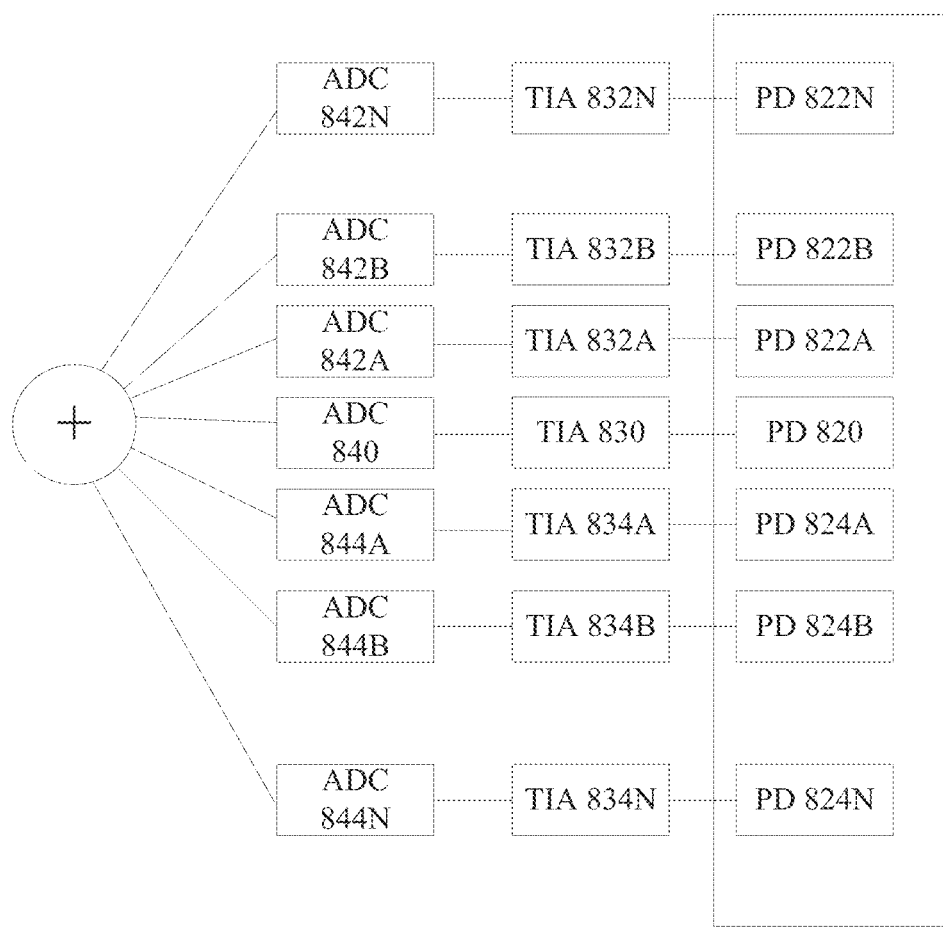
FIG. 8A is a block diagram of an example signal processing system according to embodiments of the present disclosure.

FIG. 8A illustrates a signal processing system 700 for processing of a signal of a returned optical beam received from at least one of several receiving waveguides. Each optical detector (PD) 820, 822A-N, and 824A-N may be coupled with a receiving waveguide to detect a returned optical beam. To process the returned signal, each of the PDs 820, 822A-N, and 824A-N may be coupled with a TIA 830, 832A-N, 834A-N and an analog-to-digital converter (ADC) 840, 842A-N, and 844A-N in series to both filter out noise and convert the analog signal to a digital signal. After the signals from the PDs 820, 822A-N, and 824A-N are amplified and filtered, the signals may be combined (e.g., summed) into a single signal for further processing (e.g., by the LIDAR control systems 110 of FIG. 1).

Figure 8B:
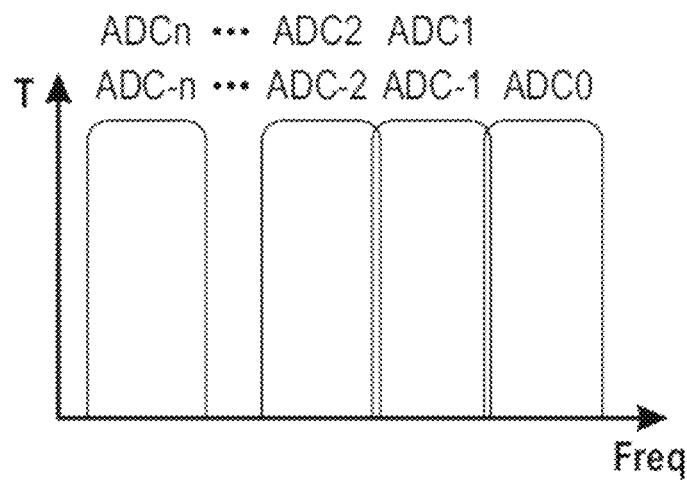
FIG. 8B is a graph diagram of an example distribution of frequencies amplified by a signal processing system according to embodiments of the present disclosure.

Each ADC 840, 842A-N, and 844A-N may allow a different band-range depending on the position of the waveguide associated with the PD 820, 822A-N, and 824A-N, as depicted in FIG. 8B. FIG. 8B illustrates the different band-pass ranges for each ADC. Bandwidth of each of the ADCs may partially overlap to ensure that the full bandwidth of returned signals can be detected by the receiver. In one example, the bandwidth of each ADC may be determined by dividing the total bandwidth to be detected divided by one more than the number of optical detectors on either side of the centered optical detector, as described with respect to FIG. 7B. The waveguides may be positioned in a manner that the returned signal received by the waveguide is within the bandwidth of the band-pass filters. For example, the larger the distance to a target, the larger the lag angle will be. Target distance is also associated with a frequency range. Therefore, if the scanner optics characteristics and scanner speed are known, the frequency range which correspond to the target distance can be paired with the corresponding waveguide location.

Figure 9A:
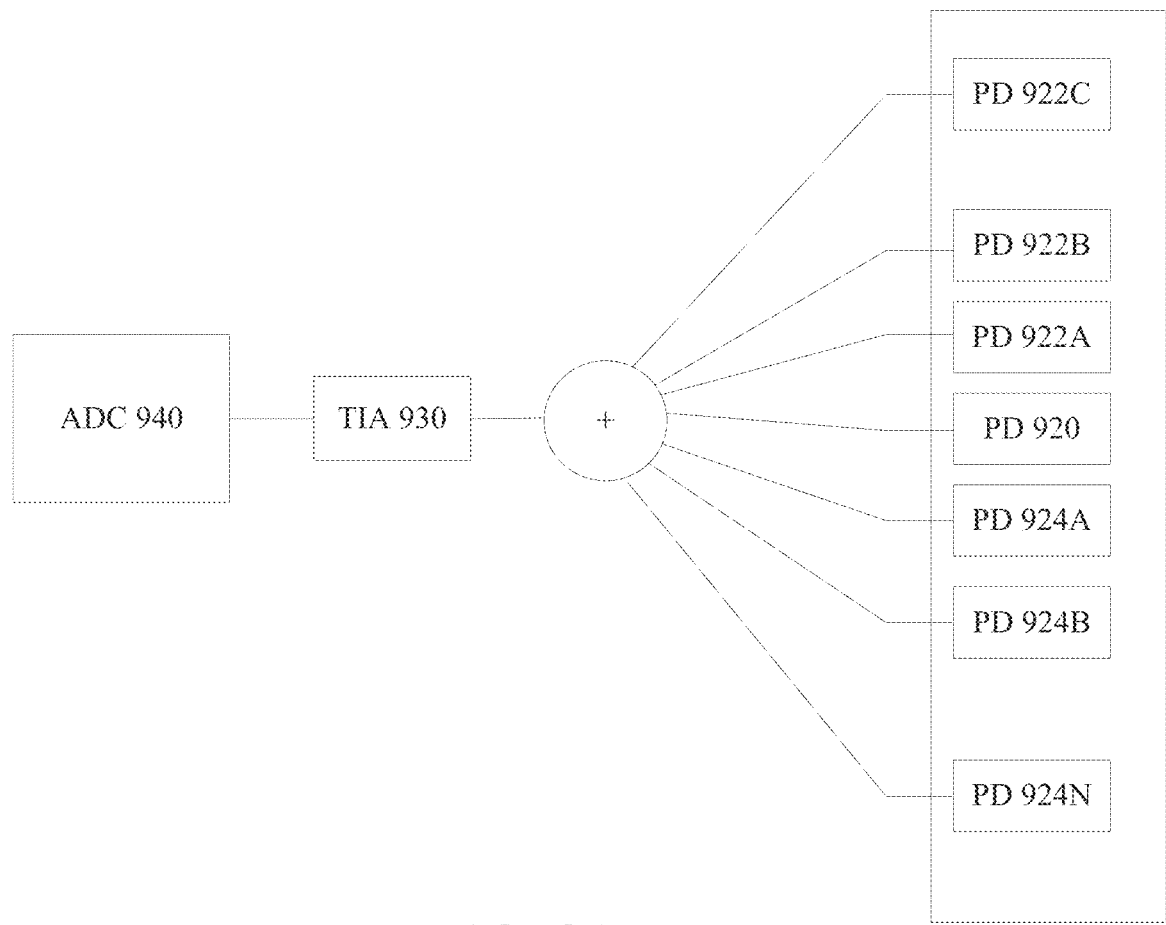
FIG. 9A is a block diagram of an example signal processing system according to embodiments of the present disclosure.

FIG. 9A illustrates a signal processing system 900 for processing signals received by multiple optical detectors (e.g., photodetectors) in parallel. Each of the optical detectors 920, 922A-N and 924A-N may be coupled in parallel with respect to one another. The currents generated by the optical detectors are thus summed up and provided to a single amplifier 930. An ADC 940 may then convert the amplified analog signal from the amplifier into a digital signal for further processing.

Figure 9B:
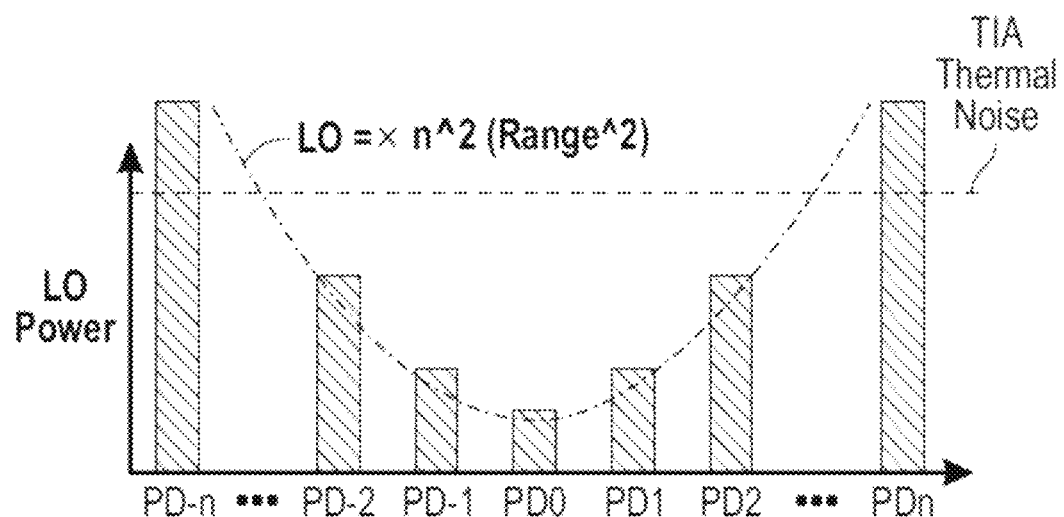
FIG. 9B is a graph diagram illustrating power distribution of a local oscillator signal to a plurality of optical detectors according to embodiments of the present disclosure.

FIG. 9B illustrates a power distribution of an LO with respect to thermal noise for each of the optical detectors (e.g., photodetectors) of signal processing system 900. The power distribution of the LO for the optical detectors may increase the further away from the optical receiver of a centered receiving waveguide. Because the waveguides at the center of the receiver receive return signals from targets that are nearest the receiver (i.e., minimal or no lag angle), the returned signal received at the center waveguides may be stronger. Therefore, the LO power may be less at the center waveguides because the total combined signal from the LO and the returned signal may be larger than the thermal noise. The further from the center the waveguides are, the further the target and the smaller the returned signal. Therefore, the LO power may be larger for the outer optical detectors to provide for a combined LO and returned signal that is larger than the thermal noise of the optical detector. In one embodiment, the LO power may be distributed among the optical detectors to maintain the same signal to noise ratio for each. For example, the LO power may be proportional to the square of the target range associated with each optical detection and associated waveguide.

Figure 10A:
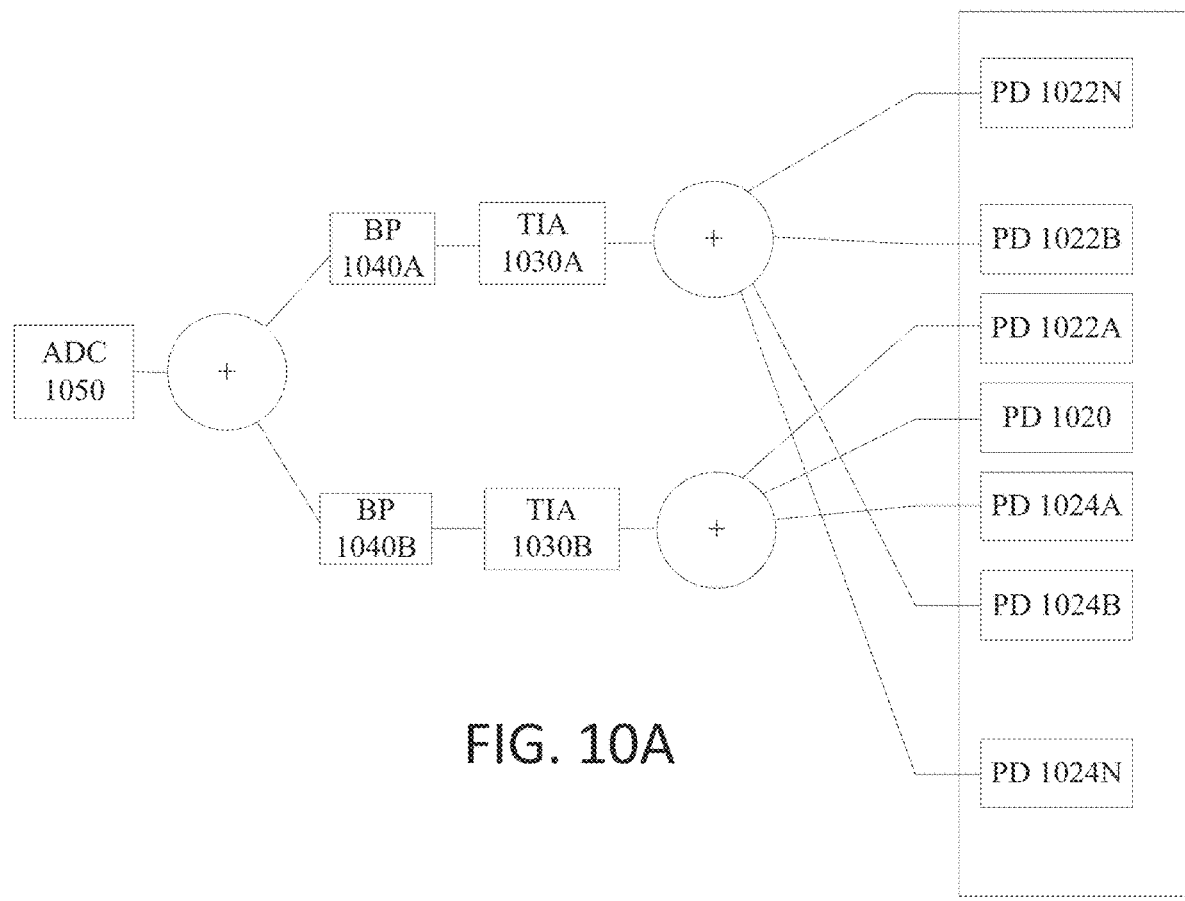
FIG. 10A is a block diagram of an example optical system according to embodiments of the present disclosure.

FIG. 10A illustrates an example signal processing system 1000 according to one embodiment of the disclosure. Signal processing system 1000 may include a plurality of PDs 1020, 1022A-N, and 1024A-N. Groups of PDs may be coupled in parallel. For example, PDs 1020, 1022A, and 1022B may be coupled in parallel and PDs 1022B-N and 1024B-N may be coupled in parallel. The groups of PDs may each be coupled to an amplifier 1030A-B and a band-pass filter 1040A-B. In this way, the shot noise from multiple optical detectors can be filtered together. Furthermore, the LO power values can be increased for mid-range targets without degrading the SNR for long range targets.

Figure 10B:
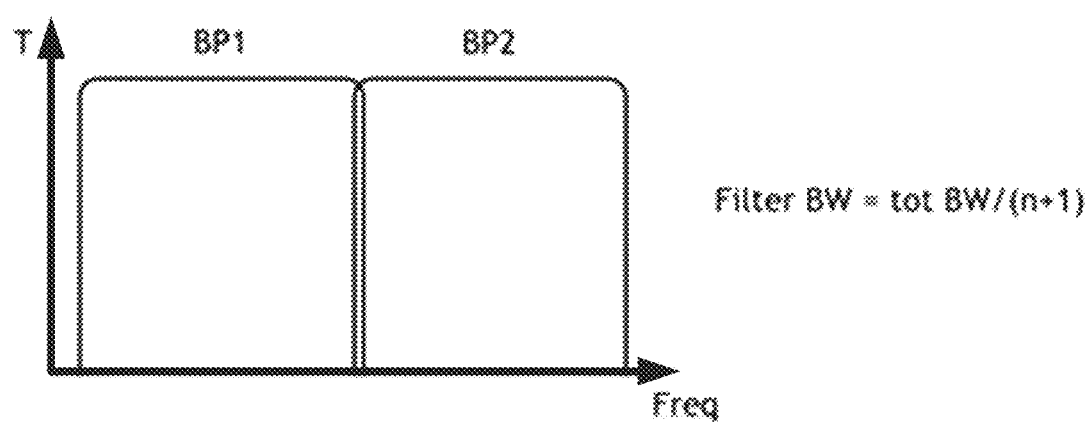
FIG. 10B is a graph diagram of an example distribution of band-pass ranges of a signal processing system according to embodiments of the present disclosure.

FIG. 10B illustrates an example band range for the band-pass filters 1040A-B. The band range for the band-pass filters may be determined based on the waveguide positions receiving the signals provided to the PDs. For example, the centered waveguides associated with PDs 1020, 1022A and 1024A may receive a returned optical signal from targets that are near the system (i.e., small lag angle and lower beat frequency). Therefore, the band ranges of the band-pass filters for groups of PDs may span the frequencies of a particular range of targets. PDs that are further from the center may have a band range associated with more distant targets because the outer PDs will receive the returned signal when there is a larger lag angle (i.e., more distant target).

Figure 10C:
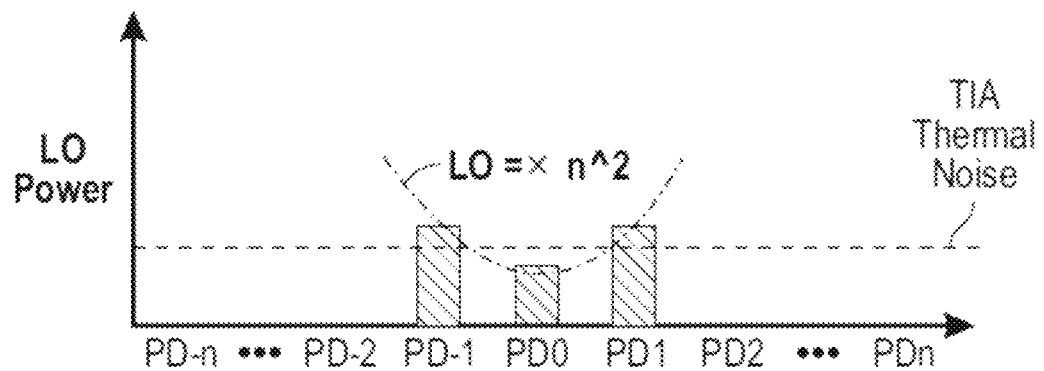
FIG. 10C is graph diagram illustrating power distribution of a local oscillator signal to a plurality of optical detectors according to embodiments of the present disclosure.

FIG. 10C illustrates an example LO power distribution for a first group of optical detectors for short and mid-range targets. Because the targets are near the LIDAR system, the returned signal may be large compared to the thermal noise of the amplifier 1030A-N and therefore the LO power can be minimized.

Figure 10D:
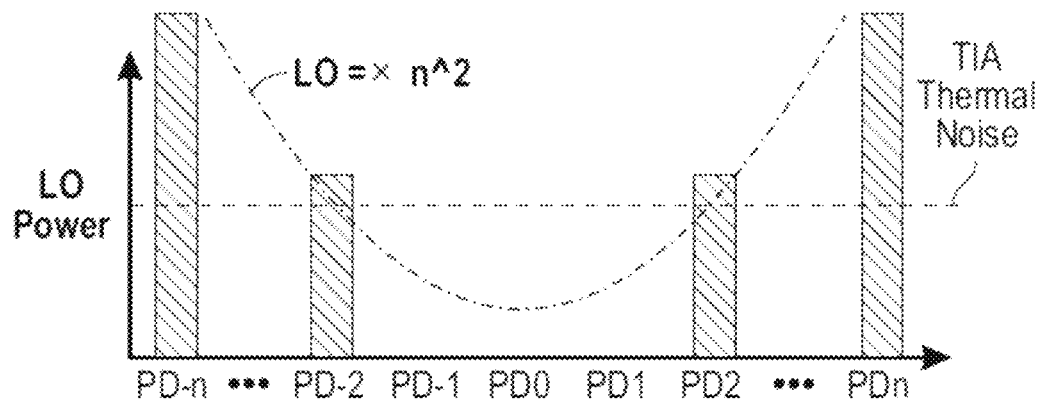
FIG. 10D is graph diagram illustrating power distribution of a local oscillator signal to a plurality of optical detectors according to embodiments of the present disclosure.

FIG. 10D illustrates an example LO power distribution for longer range targets. The LO may be larger for the mid to long range targets because the returned signal may be small relative to the thermal noise of the amplifiers. Because the short and mid-range targets are filtered separately, the LO power of the mid-range targets may be increased on the set of optical detectors to increase SNR at mid-range targets without degrading the SNR on long-range targets.

Figure 11:
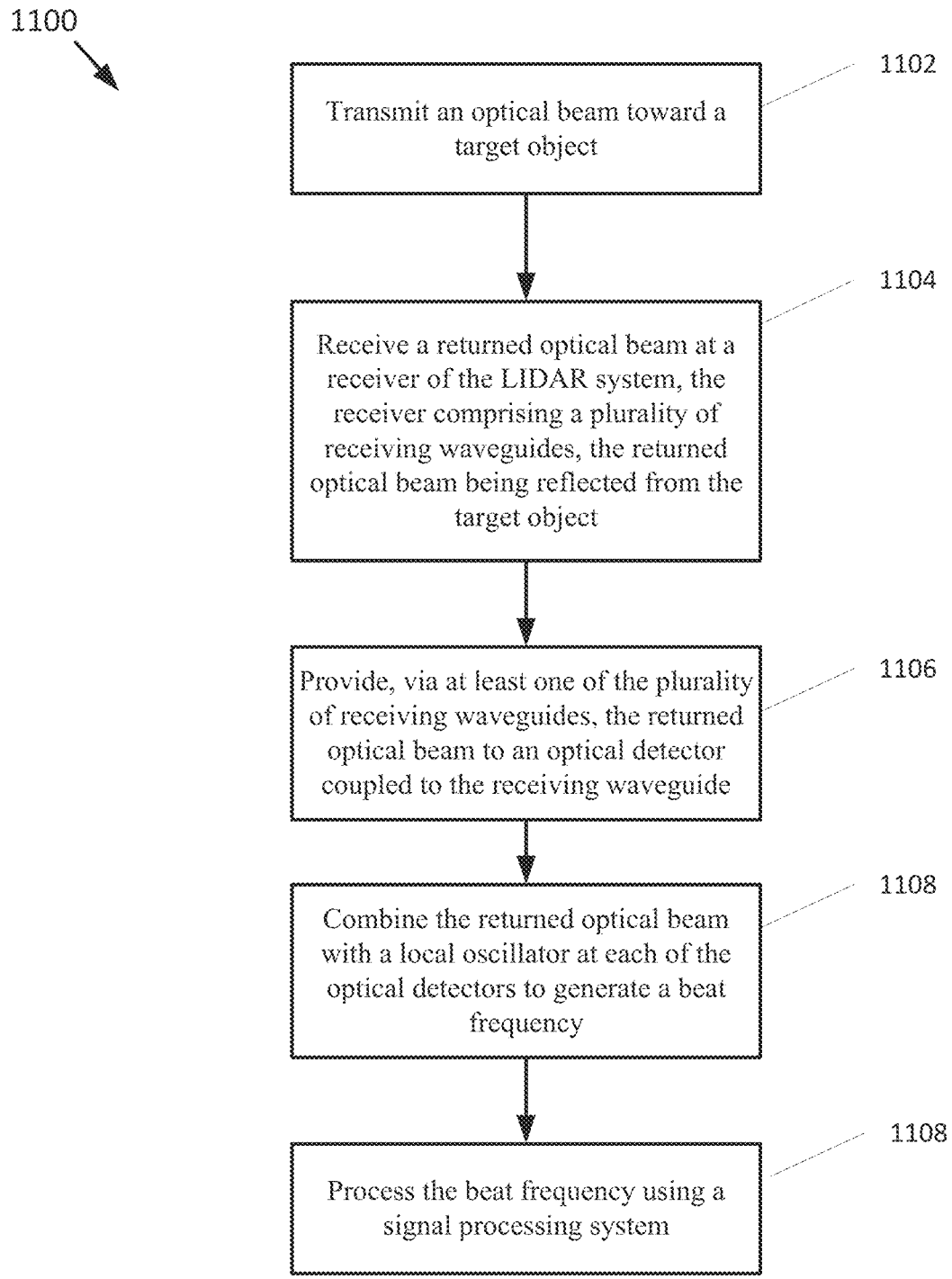
FIG. 11 is a flowchart illustrating an example method for mitigating lag angle effects of LIDAR scans according to embodiments of the present disclosure.

FIG. 11 is a flowchart illustrating an example method 1100 in a LIDAR system for mitigating lag angle effects of a LIDAR scan. Method 1100 begins at operation 1102, transmitting an optical beam toward a target object Method 1100 continues at operation 1104 receiving a returned optical beam at a receiver of the LIDAR system, the receiver including a plurality of receiving waveguides, the returned optical beam being reflected from the target object. Next, method 400 continues at operation 1106, providing, via at least one of the plurality of receiving waveguides, the returned optical beam to an optical detectors coupled to the receiving waveguide. Method 400 continues at operation 1108, combining the returned optical beam with a local oscillator at each of the optical detectors to generate a beat frequency. Method 400 continues at operation 1110, processing the beat frequency using a signal processing system.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) system, comprising:
   an optical source to generate and transmit an optical beam into an environment;
   a plurality of waveguides disposed at different positions within the LIDAR system to receive a return signal at different angles directly from a rotating scanning mirror, wherein a first waveguide of the plurality of waveguides to receive a first portion of the return signal at a first angle relative to the scanning mirror due to a first angle of rotation of the scanning mirror and a second waveguide from the plurality of waveguides to receive a second portion of the return signal at a second angle relative to the scanning mirror due to a second angle of rotation of the scanning mirror, wherein the second angle of rotation of the scanning mirror comprises a lag angle with respect to the first angle of rotation; and
   a signal processing system operatively coupled to a plurality of optical detectors to determine information of a target object based on the return signal and corresponding positions of the plurality of optical detectors, wherein a local oscillator signal is distributed across the plurality of optical detectors, wherein a power level of the local oscillator signal provided to each of the plurality of optical detectors is associated with a position of the corresponding waveguide.

2. The LIDAR system of claim 1, further comprising: one or more beam splitting components to generate a plurality of local oscillator signals from the optical beam, and provide at least one local oscillator signal from the plurality of local oscillator signals to each optical detector of the plurality of optical detectors for combination with the return signal to form a combined signal at each optical detector of the plurality of optical detectors.

3. The LIDAR system of claim 1, wherein the information comprises distance of the target object.

4. The LIDAR system of claim 3, wherein a local oscillator signal is combined with the return signal at the plurality of optical detectors to produce a beat frequency to calculate the distance.

5. The LIDAR system of claim 1, wherein the information comprises velocity of the target object.

6. The LIDAR system of claim 1, further comprising an optical transmission line comprising a transmission waveguide to transmit the optical beam to scanner optics, the scanner optics to direct the optical beam toward a target object.

7. The LIDAR system of claim 6, wherein the return signal is focused on a receiver by the scanner optics.

8. The LIDAR system of claim 1, wherein each of the plurality of waveguides are disposed on a substrate and wherein each of the plurality of waveguides is offset from an adjacent waveguide.

9. The LIDAR system of claim 8, wherein each the plurality of waveguides is offset from the adjacent waveguides by a distance to provide uniform coupling of the return signal into the plurality of waveguides.

10. The LIDAR system of claim 1, wherein the first waveguide is disposed on a first epitaxial layer of a photonics chip and the second waveguide is disposed on a second epitaxial layer of the photonics chip.

11. The LIDAR system of claim 10, wherein the first epitaxial layer is comprised of silicon nitride and the second epitaxial layer is comprised of silicon-on-oxide.

12. The LIDAR system of claim 1, further comprising a filtering component, wherein each of the plurality of optical detectors are operatively coupled to the filtering component and the plurality of optical detectors are coupled in parallel, wherein the return signal received at the plurality of optical detectors are summed prior to being provided to the filtering component.

13. A method of operating a light detection and ranging (LIDAR) system, comprising:
generating and transmitting an optical beam into an environment;
receiving, using a plurality of waveguides disposed at different positions within the LIDAR system, a return signal at different angles from a rotating scanning mirror, wherein a first waveguide of the plurality of waveguides receives a first portion of the return signal at a first angle relative to the scanning mirror due to a first angle of rotation of the scanning mirror and a second waveguide of the plurality of waveguides receives a second portion of the return signal at a second angle relative to the scanning mirror due to a second angle of rotation of the scanning mirror, wherein the second angle of rotation comprises a lag angle with respect to the first angle of rotation;
generating a plurality of local oscillator signals from the optical beam and providing at least one local oscillator signal from the plurality of local oscillator signals to each optical detector of a plurality of optical detectors for combination with the return signal to form a combined signal at each optical detector of the plurality of optical detectors, wherein the plurality of local oscillator signals are distributed across the plurality of optical detectors, and wherein a power level of each of the plurality of local oscillator signals provided to each of the plurality of optical detectors is associated with a position of the corresponding waveguide; and
determine, using a signal processing system operatively coupled to the plurality of optical detectors, information of a target object based on the combined signal at each optical detector of the plurality of optical detectors.

14. The method of claim 13, wherein receiving comprises:
setting a first waveguide of the plurality of waveguides to receive a first portion of the return signal at a first angle relative to the scanning mirror; and
setting a second waveguide from the plurality of waveguides to receive a second portion of the return signal at a second angle relative to the scanning mirror.

15. The method of claim 14, wherein the plurality of waveguides are disposed at the different positions within the LIDAR system to receive the return signal at the different angles directly from the scanning mirror.

16. The method of claim 14, wherein the information comprises distance of the target object.

17. The method of claim 16, further comprising combining the at least one local oscillator signal with the return signal at the plurality of optical detectors to produce a beat frequency to calculate the distance.

18. The method of claim 14, further comprising summing the return signal received at the plurality of optical detectors prior to being provided to a filtering component.

* * * * *